United States Patent [19]

Muldrow, Jr.

[11] 4,287,118

[45] Sep. 1, 1981

[54] ANTIMONY (V) MERCAPTIDES AS PROCESSING STABILIZERS FOR VINYL HALIDE RESINS AND METHOD OF MANUFACTURING SAME

[75] Inventor: Charles N. Muldrow, Jr., East Windsor, N.J.

[73] Assignee: Associated Lead Inc., Philadelphia, Pa.

[21] Appl. No.: 77,057

[22] Filed: Sep. 19, 1979

Related U.S. Application Data

[63] Continuation-in-part of Ser. No. 936,120, Aug. 23, 1978, abandoned.

[51] Int. Cl.³ ............................ C08K 5/59; C07F 9/90
[52] U.S. Cl. ............................ 260/45.75 B; 260/446
[58] Field of Search ................. 260/45.75 B, 347.2, 260/446; 528/285; 424/296

[56] References Cited

U.S. PATENT DOCUMENTS

| | | | |
|---|---|---|---|
| 2,510,738 | 6/1950 | Weinberg et al. | 260/446 |
| 2,641,588 | 6/1953 | Leistner et al. | 260/347.2 |
| 2,684,956 | 7/1954 | Weinberg | 260/45.75 B |
| 3,317,576 | 5/1967 | Malz et al. | 260/45.75 B |
| 3,340,285 | 9/1967 | Remes et al. | 260/45.75 B |
| 3,884,854 | 5/1975 | Ventura | 528/285 |
| 4,029,618 | 6/1977 | Dieckmann | 260/45.75 B |
| 4,169,104 | 9/1979 | Burt | 260/446 |

OTHER PUBLICATIONS

Organic Chemistry of Bivalent Sulfur vol. I Reid (1958) pp. 126–155.

*Primary Examiner*—V. P. Hoke
*Attorney, Agent, or Firm*—Kenyon & Kenyon

[57] ABSTRACT

Novel compositions useful as stabilizers during the production of vinyl halide resins are disclosed which comprise pentavalent antimony mercaptides having the general formula:

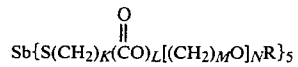

wherein
K is 0 to 4;
L is 0 to 1;
M is 0 to 4;
N is 0 to 4; and
R is a primary alkyl, alkenyl, alkynyl having 1 to 18 carbon atoms and combinations thereof.

Also disclosed is a novel method for synthesizing such compounds which comprises a single-reaction of a thiol, having the general formula HS-R, with sodium antimonate and concentrated hydrochloric acid whereby the pentavalent antimony mercaptide is obtained. The compositions of the present invention when used during vinyl halide resin processing retard discoloration and mechanical degradation at least as effectively as previously known antimony mercaptides while exhibiting shelf and light stabilities superior thereto.

26 Claims, No Drawings

ANTIMONY (V) MERCAPTIDES AS PROCESSING STABILIZERS FOR VINYL HALIDE RESINS AND METHOD OF MANUFACTURING SAME

This application is a continuation-in-part application of application Ser. No. 936,120 filed on Aug. 23, 1978, now abandoned.

The present invention relates to novel compositions and their use in the production of vinyl halide resins, and more particularly, polyvinyl chloride. The pentavalent antimony mercaptides [antimony (V) mercaptides] of the present invention are prepared from mercaptans that may contain one or more carboxylic acid ester groups and one or more aliphatic ether groups.

The use of antimony mercaptides as stabilizers for vinyl halide resins to guard against degradation by heat during molding and working of the resin into useful articles is known. For example, U.S. Pat. Nos. 2,680,726; 2,684,956; and 3,340,285; 3,399,220; 3,466,261; and 3,530,158 all disclose antimony organic sulphur-containing compounds as well as acknowledging their utility as stabilizers. Most recently, in U.S. Pat. Nos. 3,887,508 and 4,029,618, improved antimony mercaptides are disclosed which purportedly overcome various shortcomings, including high cost, said to exist in the other prior art materials, noteably, the propensity of such compounds to exude from molded or worked polyvinyl chloride plastic stock. The antimony mercaptides disclosed in the last two mentioned patents include, among others, antimony (III) isooctyl thioglycolate.

The aforementioned prior art are concerned with trivalent or antimony (III) mercaptides. As far as is known, pentavalent antimony mercaptides of the type described herein have not heretofore been synthesized for any purpose and their use as processing stabilizers in the production of vinyl halide resins has never been suggested.

Thus, a new class of compounds which comprises antimony (V) mercaptides has now been discovered which show color and heat stability results during vinyl halide resin processing which are at least as effective as the results obtained with prior art antimony (III) stabilizers while exhibiting light stabilities as great as 100 times that of the prior art compounds and improved hydrolytic stability. More particularly, the antimony (V) mercaptides of the present invention have the general formula:

wherein
K is 0 to 4;
L is 0 to 1;
M is 0 to 4;
N is 0 to 4; and
R is a primary alkyl, alkenyl, alkynyl having 1 to 18 carbon atoms and combinations thereof.

The selection of the particular antimony mercaptide species is critical to the extent necessary to enable the preparation of an effective stabilizer which exhibits a high level of light stability and hydrolytic stability.

The mercaptide groups $[S(CH_2)_K]$ of the invention are linked to the antimony primarily through covalent bonding. Such mercaptides contain 0 to 4 carbon atoms, preferably 1 or 2 carbon atoms as an alkylene group. Exemplary species include methylene, ethylene, 1,3-propylene, and 1,4-butylene. Alkylene groups having greater than 4 carbon atoms, while feasible, are not commercially available where L is one.

The carboxylic acid ester group

of the invention, if present, is linked to the mercaptide group through a carbon atom on the carboxylic acid moiety and linked through the acid ester to the remainder of the composition. The compositions of the invention may be prepared without the presence of such carboxylic acid ester group to yield effective materials.

The ether groups $[(CH_2)_MO]_N$ of the invention are linked to the carboxylic acid ester group and the alkyl, alkenyl, alkynyl groups discussed below. Such ether groups contain 0 to 4 carbon atoms preferably 1 or 2, and when present one of the carbon atoms is linked to the carboxylic acid ester group. Exemplary species include methylene ether, ethylene ether, 1,3-propylene ether, and 1,4-butylene ether. Alkylene ethers having greater than 4 carbon atoms, while feasible, are not commercially available. The ether groups may be repeative groups having preferably 1 to 4 units of the aforementioned species.

The R group in the antimony mercaptides of this invention contain 1 to 18 carbon atoms and may comprise a primary alkyl, alkenyl and alkynyl moiety as well as combinations thereof. In the case where the R is a primary alkyl group, exemplary species include methyl, ethyl, n-propyl, n-butyl, n-pentyl, n-hexyl, n-octyl, isooctyl, n-nonyl, n-decyl, n-dodecyl, n-tetradecyl, n-hexadecyl and n-octadecyl. Preferred alkyl moieties are selected from those groups having 2 to 8 carbon atoms. In the case where the R is an alkenyl group, exemplary species include allyl, crotyl, 1-butenyl and 2-pentenyl. In the case where the R is an alkynyl group, exemplary species include 2-propynyl, 2-butynyl, and 2-pentynyl. Preferred alkenyl and alkynyl moieties are selected from those groups having 2 to 8 carbon atoms.

Specific examples of the ether antimony (V) mercaptides which are within the scope of this invention include, but are not limited to, the following: antimony (V) isooctyl thioglycolate, antimony (V) 2-butoxyethyl thioglycolate, antimony (V) 2-ethoxyethyl thioglycolate, antimony (V) hexyl thioglycolate, antimony (V) ethoxyethoxyethyl thioglycolate, antimony (V) butyl thioglycolate, and antimony (V) 2-ethylhexyl 3-mercaptopropionate.

Compounds of the invention may be prepared containing a pentavalent antimony mercaptide containing only an R group, that is where K, L, M and N are zero. Specific examples of the antimony (V) mercaptides of the present invention where R is an alkyl include the antimony mercaptides of octyl mercaptan, decyl mercaptan and dodecyl mercaptan.

As a general matter, the antimony (V) mercaptides of the present invention may be substituted for any of the trivalent antimony mercaptides known in the prior art. With respect to the pentavalent compounds, however, it has been found that the relatively shorter radicals which comprise R are to be preferred. In this regard, it should be noted that certain of the antimony mercaptides described hereinabove, specifically those which include one or more aliphatic ether groups, and may include one or more carboxylic acid ester groups, such compounds, are themselves novel in the trivalent form. For a further description of same, reference should be made to applicant's co-pending application Ser. No. 63,597 entitled "Antimony Mercaptides as Processing Stabilzers for Vinyl Halide Resins." The novel compounds of this invention may be used according to known procedures as vinyl halide resin stabilizers.

In another aspect of the present invention, stabilized vinyl halide resin compositions are provided which incorporate from about 0.01 to 3.0 PHR (parts per 100 parts resin) of the novel antimony (V) mercaptides described hereinabove and preferably from about 0.5 to 2 PHR. The procedures for preparing such vinyl halide compositions, and particularly polyvinyl chloride, are well-known in the art as described, for example, in U.S. Pat. Nos. 2,680,726; 2,604,458 and 4,029,618, hereby incorporated by reference. The novel compounds of this invention may be used alone or in combination with other compatible stabilizers, such as conventional organic stabilizers for vinyl halide resins, such as epoxides, organic phosphites and phenolics according to known procedures.

Still another aspect of the present invention resides in the discovery of a novel method for preparing the antimony (V) mercaptides described above. Specifically, such process involves reacting a mercaptan within the scope of the compounds described above with sodium antimonate and a concentrated non-oxidizing mineral acid such as hydrochloric acid or hydrobromic acid whereby an antimony (V) mercaptide is obtained having the general formula as detailed above. More particularly, such method comprises the steps of mixing sodium antimonate and the mercaptan and thereafter adding concentrated hydrochloric acid thereto, subsequently heating the mixture to a temperature of from about 50° to 150° C., preferably from about 80° to 120° C., for a time of from about 1 to 10 hours, and preferably from about 2 to 6 hours. Thereafter, the byproduct of the reaction, water, can be distilled off and the antimony (V) mercaptide recovered. If desired, the resulting product can be filtered to remove the other byproduct of the reaction, i.e., sodium chloride or sodium bromide. Such filtration can also be used to remove any unreacted sodium antimonate from the final product.

As a general matter, the antimony (V) mercaptides of the present invention can be prepared by reacting the mercaptan with other sources of pentavalent antimony such as, for example, antimony pentoxide which do not require the presence of hydrochloric acid to render the pentavalent antimony available for reaction. However, sodium antimonate is far less expensive than antimony pentoxide and, as such, is to be preferred for synthesizing such compounds. In this regard, the discovery that sodium antimonate would react in such fashion in the presence of hydrochloric acid to give the antimony (V) mercaptides of the present invention was particularly surprising in that it was believed by those skilled in this art that the presence of the hydrochloric acid would have prevented the reaction from taking place, particularly where esters were involved. Specifically, it was thought that the acid would tend to break up the bonds in the mercaptan and particularly the ester group. While not wishing to be bound by any particular theory, it is believed that such is not the case due to the relatively fast rate of reaction which results in the formation of the antimony (V) mercaptides according to this procedure.

The following examples are given to illustrate the methods of synthesizing the novel antimony (V) mercaptides of the present invention, it being understood that such examples are illustrative only and are not deemed to be limiting thereof. All percentages given are based upon weight unless otherwise indicated.

EXAMPLE I

Sodium antimonate obtained from U.S. Antimony Corporation (19.2 g, 0.0476 mole) was placed in a reaction vessel and isooctyl thioglycolate from Evans Chemetics, Inc. (97.08 g, 0.4759 mole) added and stirred. Concentrated hydrochloric acid from Fisher Scientific Co. (9.5 ML, 0.0952 mole) was added dropwise and an immediate temperature increase of 12° C. was observed. The mixture was heated and the byproduct, water, was distilled over at 97° C. and collected. After 3.5 hours, a 93% yield of antimony (V) isooctyl thioglycolate was obtained. The resultant product was filtered to remove unreacted sodium antimonate and the additional byproduct of the reaction, sodium chloride. The product was then vacuum distilled at 3 mm Hg and a temperature range of 24°–100° C. to remove any unreacted isooctyl thioglycolate.

EXAMPLE II

Thioglycolic acid obtained from Evans Chemetics, Inc. (75 ml, 1.0785 mole) was added dropwise to hexanol obtained from Continental Oil Company (135.6 ml, 1.0785 mole) with 12% Dowex cation exchange resin 50W×12 50/100 (12% cross-linking, 13.2 g) as a catalyst. The solution was stirred and a nitrogen atmosphere maintained. The mixture was thereafter heated, and the byproduct, water, was distilled over as an azeotrope with hexanol at 95° C. and collected. A 10 ml excess of hexanol was added to the reaction mixture to replace that lost in the azeotrope. After 2.5 hours, an 89% yield was obtained. A vacuum of 60 mm Hg was then applied to further the reaction without increasing the temperature. After an additional hour, a 95.9% yield of hexyl thioglycolate was obtained.

Sodium antimonate obtained from U.S. Antimony Corporation (22.73 g, 0.0563 mole) was placed in the reaction vessel and the hexyl thioglycolate (100 ml, 0.5625 mole) added and stirred. Concentrated hydrochloric acid from Fisher Scientic Co. (9.52 ml, 0.1125 mole) was added dropwise, and an immediate temperature rise of 12° C. occurred. The mixture was thereafter heated and the byproduct of the reaction, water, was distilled over at 96° C. and collected. After 2 hours, a 92% yield of antimony (V) hexyl thioglycolate was obtained. The product was filtered to remove unreacted sodium antimonate and the additional byproduct of the reaction, sodium chloride.

EXAMPLE III

Antimony peroxide obtained from N L Industries, Inc. (15.42 g, 0.4759 mole) was placed in the reaction vessel and 50 ml of isooctyl thioglycolate from Evans Chemetics, Inc. added and stirred. An immediate color change (white to yellow) was observed. An additional 50 ml of the isooctyl thioglycolate was added and the solution turned pale yellow. The mixture was heated and the reactants vigorously stirred while maintaining a nitrogen atmosphere. The byproduct, water, was distilled over at 95° C. and collected. After 4 hours, a 93.5% yield of antimony (V) isooctyl thioglycolate was obtained. The product was then filtered to remove unreacted antimony pentoxide.

EXAMPLE IV

Sodium antimonate obtained from U.S. Antimony Corporation (9.49 g, 0.02347 mole) was placed in a reaction vessel and 1-decanethiol from Eastman Kodak (50 ml, 0.2347 mole) added and stirred. Concentrated hydrochloric acid (3.9 ml, 0.0468 mole) was added dropwise and an immediate temperature increase of 4° C. was observed. The mixture was heated and the by-product of the reaction, water, was distilled over at 28° C. and a vacuum of 50 mm Hg. After 2.5 hours 45.57 g of antimony (V) decanethiol was obtained. The product was filtered to remove unreacted sodium antimonate and the additional byproduct of the reaction, sodium chloride.

In order to demonstrate the effectiveness of the novel compounds of the present invention as stabilizers in the production of vinyl halide resins, and particularly polyvinyl chloride, BRABENDER heat stability data was taken on various of the antimony (V) mercaptides of the present invention in order to compare same to similar data taken for a commercial grade of antimony (III) isooctyl thioglycolate. First, a master batch blend of approximately 2 kg of all the ingredients in a conventional polyvinyl chloride pipe formulation with the exception of the stabilizer was prepared. Such formulation was as follows:

| | |
|---|---|
| GEON 103 EPF76 | 100 PHR |
| OMYALITE 90-T | 2.5 |
| TITANOX 2071 | 1.0 |
| Calcium stearate | 0.7 |
| 165° paraffin wax | 1.0 |
| PLASTIFLOW POP | 0.15 |

GEON is a trademark of B. F. Goodrich Co. for polyvinyl chloride resin.

OMYALITE is a trademark of PLUESS-STAUFFER for calcium carbonate having an average particle diameter of 0.7 microns.

TITANOX is a trademark of N L Industries, Inc. for $TiO_2$.

PLASTIFLOW POP is a trademark of N L Industries, Inc. for modified polyethylene wax.

The BRABENDER test method is performed as follows:

(1) Prepare a blend of all ingredients in a conventional PVC pipe formulation, such as herein described in the absence of the stabilizer.

(2) Add the antimony mercaptide stabilizer to aliquots of the blend at equal antimony values, to yield 0.06 parts antimony per 100 parts resin.

(3) Place 48 cc of the stabilized resin to a No. 6 oil heated BRABENDER Plasti-Corder equipped with a stirrer.

(4) The Plasti-Corder is operated at a rotor speed of 50 rpm and at a temperature of 197° C.

(5) During operation, fusion time, fusion torque, and heat stabilities are measured and the test is terminated upon evolution of hydrogen chloride.

The antimony mercaptides (commercial and experimental) at a level of approximately 0.06 PHR antimony were then added to aliquots of the master batch. A No. 6 oil heated BRABENDER Plasti-Corder with 48 cc of stabilized compound in the 197° C. mixing bowl was operated at a motor speed of 50 rpm. The fusion and heat stability times, and the fusion and equilibrium torques, were recorded. When litmus tests showed evolution of HCl, the test was complete.

The following table records the data obtained from following the foregoing procedure:

TABLE I

| | BRABENDER Times (Minutes) | | |
|---|---|---|---|
| Antimony Mercaptides | Level PHR* | Color Break | Heat Stability |
| Set A: | | | |
| Commercial antimony (III) isooctyl thioglycolate (1) | 0.50 | 8 | 10 |
| Antimony (V) isooctyl Thioglycolate (from Sodium Antimonate) | 0.61 | 8 | 10 |
| Antimony (V) isooctyl Thioglycolate (from Antimony Pentoxide) | 0.64 | 8 | 10 |
| Set B: | | | |
| Commercial antimony (III) isooctyl thioglycolate (1) | 0.50 | 8 | 9.4 |
| Antimony (V) 2-butoxy-ethyl Thioglycolate | 0.47 | 8 | 9.6 |
| Antimony hexyl thioglycolate | 0.55 | 8 | 9.6 |
| Antimony (V) 2-ethoxy-ethyl thioglycolate | 0.50 | 8 | 9.6 |
| Antimony (V) butoxy-ethoxyethyl thioglycolate | 0.54 | 8 | 8.9 |
| Antimony (V) ethoxyethoxy-ethyl thioglycolate | 0.58 | 8 | 8.7 |

(1) Average Value: 11.5% antimony concentration
70.0% antimony isooctyl thioglycolate
1% p-tert-butyl catechol
29% mineral oil

*The Level PHR means that level of addition of equivalent antimony mercaptide to yield 0.06 PHR antimony.

As can readily be seen by reference to Table I, the results obtained during the experiments for both color break and heat stability indicates that the antimony mercaptides of the present invention exhibit properties which are at least equivalent to, and in some cases superior to, those obtained with the comparative materials. An additional advantage, however, which results from the novel antimony (V) mercaptides of the present invention is that such products exhibit a light stability as great as 100 times that of the comparable antimony (III) mercaptides and superior hydrolytic stability. Thus, it will be appreciated that the discovery of such compounds represents a significant advance in the art pertaining to vinyl halide resin production.

The invention being thus described, it would be obvious that the same may be varied in many ways. Such variations are not to be regarded as a departure from the spirit and scope of the invention, and all such modifications are intended to be included within the scope of the following claims.

What is claimed is:

1. A composition comprising a pentavalent antimony mercaptide having the formula

wherein
K is 1 to 4;
M is 1 to 4;
N is 0 to 4;

R is a primary alkyl, alkenyl, alkynyl having from 1 to 18 carbon atoms and combinations thereof.

2. The composition of claim 1 which comprises antimony (V) isooctyl thioglycolate.

3. The composition of claim 1 which comprises antimony (V) 2-butoxyethyl thioglycolate.

4. The composition of claim 1 which comprises antimony (V) 2-ethoxyethyl thioglycolate.

5. The composition of claim 1 which comprises antimony (V) butoxyethoxyethyl thioglycolate.

6. The composition of claim 1 which comprises antimony (V) ethoxyethoxyethyl thioglycolate.

7. The composition of claim 1 which comprises antimony (V) hexyl thioglycolate.

8. A composition comprising a pentavalent antimony mercaptide having the formula:

$$Sb\{S(CH_2)R\}_5$$

wherein R is a primary alkyl, alkenyl, alkynyl having from 1 to 18 carbon atoms and combinations thereof.

9. The composition of claim 8 which comprises antimony (V) octyl mercaptide.

10. The composition of claim 8 which comprises antimony (V) decyl mercaptide.

11. The composition of claim 8 which comprises antimony (V) dodecyl mercaptide.

12. A vinyl halide resin composition comprising a pentavalent antimony mercaptide having the formula:

$$Sb\{S(CH_2)_K(\overset{O}{\overset{\|}{C}}O)[(CH_2)_MO]_NR\}_5$$

wherein
K is 1 to 4;
M is 1 to 4;
N is 0 to 4;
R is primary alkyl, alkenyl, alkynyl having from 1 to 18 carbon atoms and combinations thereof.

13. The composition of claim 12 in which the pentavalent antimony mercaptide comprises antimony (V) isooctyl thioglycolate.

14. The composition of claim 12 in which the pentavalent antimony mercaptide comprises antimony (V) 2-butoxyethyl thioglycolate.

15. The composition of claim 12 in which the pentavalent antimony mercaptide comprises antimony (V) 2-ethoxyethyl thioglycolate.

16. The composition of claim 12 in which the pentavalent antimony mercaptide comprises antimony (V) butoxyethoxyethyl thioglycolate.

17. The composition of claim 12 in which the pentavalent antimony mercaptide comprises antimony (V) ethoxyethoxyethyl thioglycolate.

18. The composition of claim 12 in which the pentavalent antimony mercaptide comprises antimony (V) hexyl thioglycolate.

19. A vinyl halide resin composition comprising a pentavalent antimony mercaptide having the formula:

$$Sb\{S(CH_2)R\}_5$$

wherein R is a primary alkyl, alkenyl, alkynyl having 1 to 18 carbon atoms and combinations thereof.

20. The composition of claim 19 in which the pentavalent antimony mercaptide is antimony (V) octyl mercaptide.

21. The composition of claim 19 in which the pentavalent antimony mercaptide is antimony (V) decyl mercaptide.

22. The composition of claim 19 in which the pentavalent antimony mercaptide is antimony (V) dodecyl mercaptide.

23. A method of preparing a pentavalent antimony mercaptide of the formula:

$$Sb\{S(CH_2)_K(\overset{O}{\overset{\|}{C}}O)[(CH_2)_MO]_NR\}_5$$

wherein
K is 1 to 4;
M is 1 to 4;
N is 0 to 4;
R is a primary alkyl, alkenyl, alkynyl having from 1 to 18 carbon atoms and combinations thereof, which comprises the steps of
(a) mixing sodium antimonate and a mercaptan having the formula:

$$HS(CH_2)_K(\overset{O}{\overset{\|}{C}}O)[(CH_2)_MO]_NR;$$

(b) adding a non-oxidizing mineral acid; and
(c) heating the mixture to a temperature of from about 50° C. to 150° C. for a time of from about 1 to about 10 hours.

24. The method of claim 23 in which the mercaptan is isooctyl thioglycolate and the non-oxidizing mineral acid is hydrochloric acid.

25. A method of preparing a pentavalent antimony mercaptide of the formula:

$$Sb\{SCH_2R\}_5$$

wherein R is primary alkyl, alkenyl, alkynyl having from 1 to 18 carbon atoms and combinations thereof, which comprises the steps of
(a) mixing sodium antimonate and a mercaptan having the formula:

$$HSCH_2R;$$

(b) adding a non-oxidizing mineral acid; and
(c) heating the mixture to a temperature of from about 50° C. to 150° C. for a time of from about 1 to about 10 hours.

26. The process according to claim 25 in which the mercaptan is decanethiol and the non-oxidizing mineral acid is hydrochloric acid.

* * * * *